United States Patent

[11] 3,631,426

[72] Inventors Daren R. Appelt
Houston, Tex.;
Granville E. Ott, Columbia, Mo.
[21] Appl. No. 888,337
[22] Filed Dec. 29, 1969
[45] Patented Dec. 28, 1971
[73] Assignee Texas Instruments Incorporated
Dallas, Tex.

[54] INFORMATION STORAGE SYSTEM HAVING MASTER AND REDUNDANT DATA ON TAPE IN TURRET SUPPORTED CARTRIDGES
6 Claims, 11 Drawing Figs.

[52] U.S. Cl. 340/174.1 B, 179/100.2 Z, 340/174.1 C
[51] Int. Cl. G11b 5/02, G11b 23/08
[50] Field of Search 179/100.2 Z; 340/174.1 B, 174.1 C

[56] References Cited
UNITED STATES PATENTS

| | | | |
|---|---|---|---|
| 2,813,259 | 11/1957 | Burkhart | 340/174.1 B |
| 3,525,086 | 8/1970 | Lichowsky | 340/174.1 C |

*Primary Examiner*—Bernard Konick
*Assistant Examiner*—J. Russell Goudeau
*Attorneys*—Samuel M. Mims, Jr., James O. Dixon, Andrew M. Hassell, Rene E. Grossman, Mel Sharp and John Vandigriff

ABSTRACT: In a information storage system, a turret supports a plurality of cartridges which in turn enclose individual lengths of magnetic tape. The turret rotates the cartridges to an apparatus that selectively transfers the cartridges to an information recording/reproducing station. At the station, phase modulated data is simultaneously recorded along 32 master data tracks. At the same time, the same data is encoded and recorded along 32 redundant tracks. During reproduction, all 64 tracks are read simultaneously. Data from the master data tracks is selected unless a parity error occurs, whereupon data from the corresponding redundant track is used.

INVENTORS
DAREN R. APPELT
GRANVILLE E. OTT

René E. Grossman

ATTORNEY

INVENTORS:
DAREN R. APPELT
GRANVILLE E. OTT

René E. Grossman

ATTORNEY

INVENTORS
DAREN R. APPELT
GRANVILLE E. OTT

René E. Grossman

ATTORNEY

INVENTORS
DARREN R. APPELT
GRANVILLE E. OTT

René E. Grossman

ATTORNEY

INVENTORS
DAREN R. APPELT
GRANVILLE E. OTT

René E. Grossman

ATTORNEY

INFORMATION STORAGE SYSTEM HAVING MASTER AND REDUNDANT DATA ON TAPE IN TURRET SUPPORTED CARTRIDGES

At the present time, various information storage systems are in use. These include magnetic drum systems, magnetic disc systems, magnetic card systems and magnetic tape systems. Nevertheless, all of the presently available information storage systems have certain inherent disadvantages.

For example, magnetic drum systems are relatively expensive and have limited storage capacities. Magnetic disc systems have greater storage capacities than drum systems but are otherwise similar to drum systems in that they are very expensive to purchase or lease. Magnetic card systems are relatively inexpensive and sometimes have large data storage capacities. However, magnetic card systems have very low data transfer rates and very slow access times. Presently available magnetic tape systems have better data transfer rates than magnetic card systems and are low in cost but typically have slow access times and limited storage capacities.

The present invention relates to an inexpensive information storage system that has a good access time and that is characterized by a very high storage capacity and a very high data transfer rate. In accordance with the preferred embodiment of the invention, phase modulated data bits are simultaneously recorded along parallel tracks that extend longitudinally of a magnetic tape. Improved reliability is achieved by simultaneously recording the bits on a master track and on a redundant track. Preferably, the system includes a plurality of tapes each mounted in a tape cartridge and apparatus for selectively positioning the cartridges at an information recording/reproducing station.

A more complete understanding of the invention may be had by referring to the following detailed description when taken in conjunction with the drawings, wherein.

Figure 1:
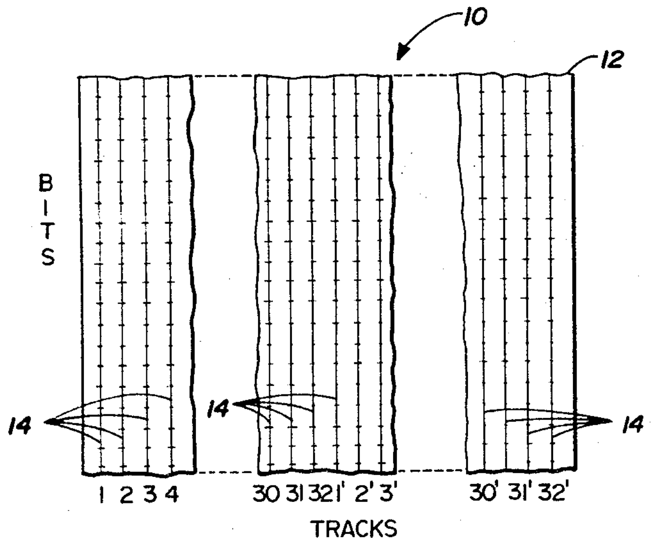
FIG. 1 is a schematic illustration of a high-density recording technique employed in the practice of the invention.

Referring now to FIG. 1, a high-density recording technique 10 that is utilized in the preferred embodiment of the invention is schematically illustrated. In accordance with the technique 10, information is recorded on a conventional ½-inch magnetic tape 12 in the form of 64 parallel tracks 14. The tracks 14 extend longitudinally of the tape 12 and are spaced at equal intervals across the width of the tape. Two groups of tracks 14 are provided, one including 32 master tracks, 1 through 32, and the other including 32 redundant tracks 1′ through 32′. Preferably, each redundant track is spaced as far as possible from its corresponding master track on the tape 12.

In the practice of the technique 10, data is simultaneously recorded along each of the master tracks 1 through 32. At the same time, the same data is simultaneously recorded along each of the redundant tracks 1′ through 32′. Preferably, all of the data is recorded by phase modulation so that all of the tracks 14 of the technique 10 are inherently self clocking.

Within each track, data is recorded in the form of nine-bit bytes each including eight information bits and one parity bit. The bytes are in turn recorded in the form of 512 byte blocks. A plurality of bits comprising a start of block signal, a block gap and a sychronization signal may be provided at the start of each block, if desired. Similarly, a plurality of bits comprising an end of block signal and a parity signal may be provided at the end of each block.

In accordance with the preferred embodiment of the technique 10, each data byte is simultaneously recorded along one of the master tracks and along the corresponding redundant track. However, each redundant byte is preferably encoded. For example, certain bits of each redundant byte may be inverted, the order of the bits may be changed, etc. By this means, the chance of the same error occuring in a master byte and in the corresponding redundant byte is greatly reduced.

The simultaneous recording of master and encoded redundant bytes along spaced master and redundant tracks is advantageous for at least two reasons. First, information recorded by high-density techniques is subject to bit crowding. This problem is virtually eliminated when the technique 10 is used because it is highly unlikely that bit crowding will produce the same result in both a master byte and in an encoded redundant byte.

The second advantage results from the positioning of the master and the redundant tracks on the tape. Even the best magnetic tapes include defects that impair recording quality. When a high-density recording technique is employed, such a defect can result in the loss of as many as several bytes. However, since the corresponding master and redundant tracks of the technique 10 are positioned as far as possible from each other, it is unlikely that the same defect will affect both of the tracks.

Figure 2:
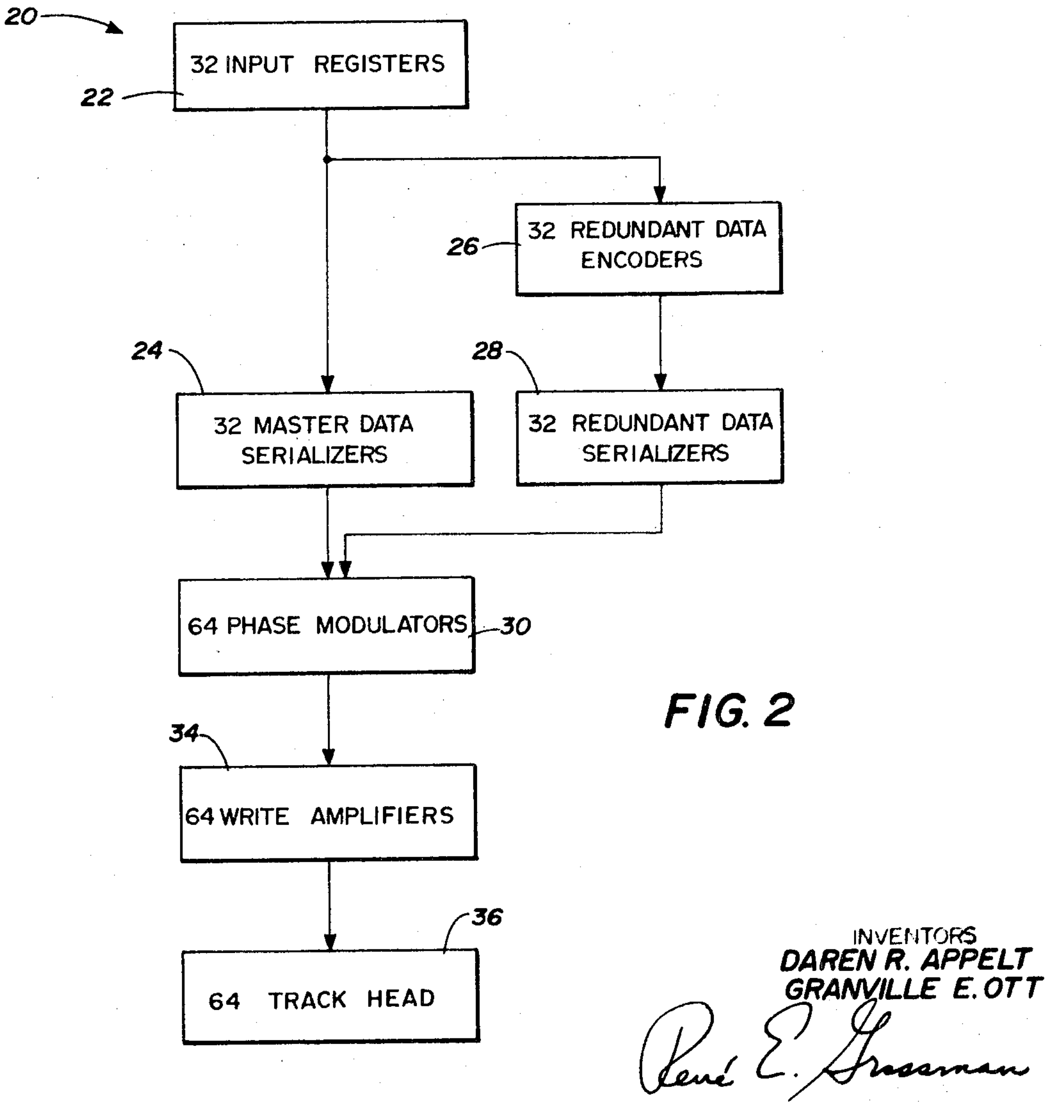
FIG. 2 is a block diagram of an information writing system that operates in accordance with the technique shown in FIG. 1.

Referring now to FIG. 2, an information writing system 20 that operates in accordance with the technique 10 is illustrated in block form. The system 20 includes a set of 32 input registers 22 each of which receives eight-bit data bytes from a data generator (not shown) in parallel and subsequently transmits the bytes to the remainder of the system 20 in parallel. The use of the registers 22 eliminates the need for synchronizing the operation of the system 20 with the output of the data generator. The set of registers 22 provides two identical sets of outputs, one of which extends to a set of 32 master data serializers 24 and the other of which extends to a set of 32 redundant data encoders 26.

Each encoder of the set 26 changes one byte into an encoded byte. The outputs of the encoders are connected to a set of 32 redundant data serializers 28 which are identical to the master data serializers. The sets of serializers 24 and 28 change the data bytes from parallel to serial and have outputs that extend to a set of 64 phase modulators 30.

Each phase modulator of the set 30 performs two functions. First, each modulator adds a parity bit to an eight-bit byte received from one of the serializers in the sets 24 and 28. Second, each phase modulator converts each bit to a phase modulated bit. The outputs of the set of phase modulators 30 extend to a group of 64 write amplifiers 34 which are in turn connected to a 64 track magnetic tape recording head 36. The head 36 records the amplified outputs of the set of phase modulators 30 in accordance with the recording technique 10 illustrated in FIG. 1.

Figure 3:
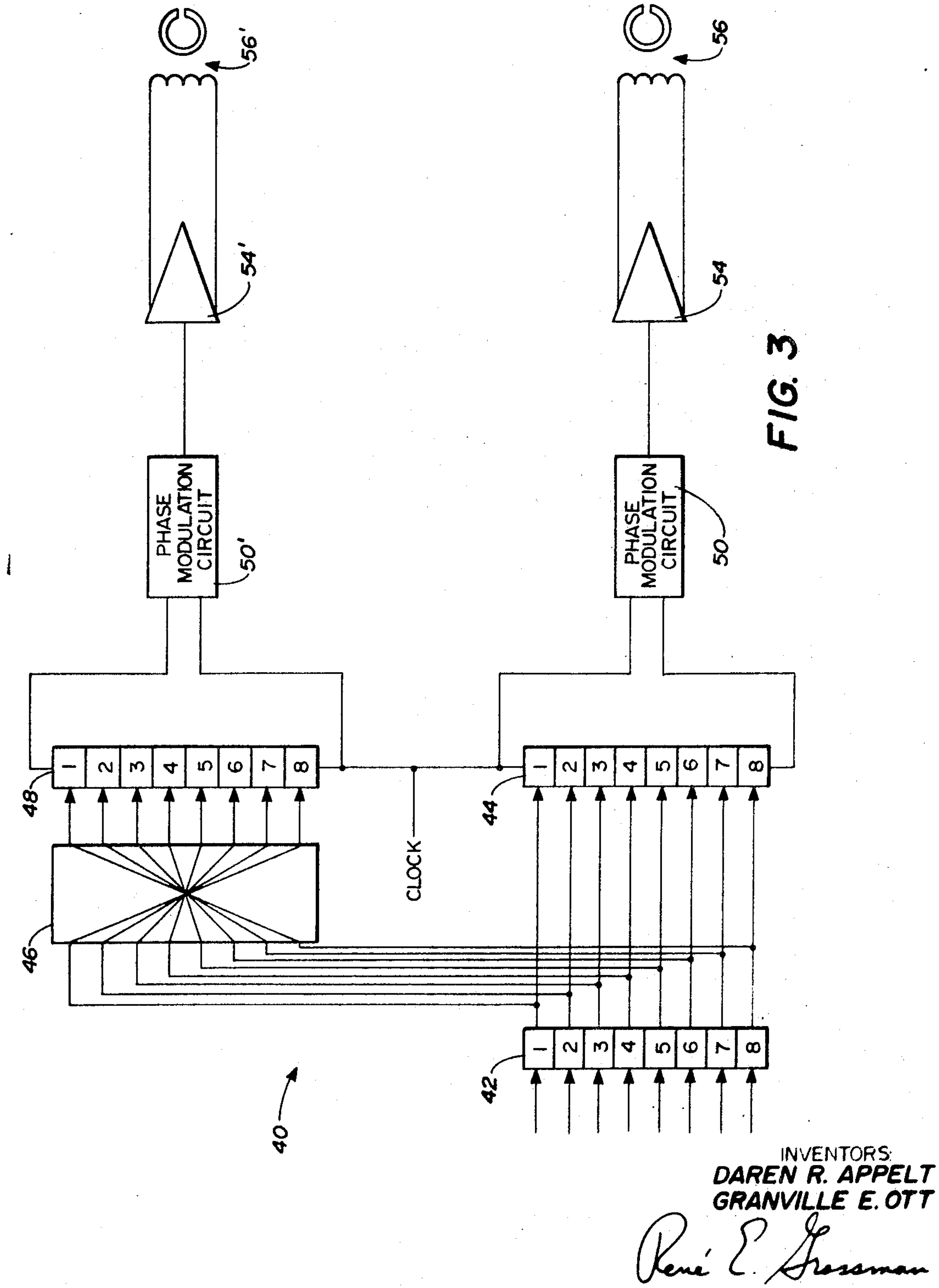
FIG. 3 is a schematic illustration of one channel of the system shown in FIG. 2.

The operation of the recording system 20 will be better understood by referring to FIG. 3 wherein a channel 40 comprising a portion of the system 20 is shown. The channel 40 comprises an illustration of the path of a signal byte through the system 20. It should be understood, however, that each channel of the system 20 is identical to the channel shown in FIG. 3.

Each input register of the set 22 preferably comprises a parallel in, parallel out shift register 42. The output of the register 42 is directed to a parallel in, serial output shift register 44 comprising one of the master data serializers of the set 24. The register 44 produces a serial output at a rate controlled by a clock pulse generator (not shown) which is connected to a phase-modulation circuit 50 comprising of the modulators of the set 30. The circuit 50 combines the output of the register 44 with the clock pulse to produce phase-modulated bits. The phase-modulated bits are amplified by an amplifier 54 comprising one of the groups 34 and are thereafter recorded by a head 56 comprising one track of the head 36.

The output of the register 42 is also directed to a data encoder circuit 46 comprising one of the encoders in the set 26. In the case shown, the circuit 46 simply reverses the order of the bits in each byte. The output of the encoder circuit 46 is connected to a parallel in, serial out shift register 48 which is identical in construction and operation to the register 44 and which comprises one serializer of the set 28. The output of the register 48 is connected to a phase-modulation circuit 50' which in turn connected to an amplifier 54'. The output of the amplifier 54' is recorded by a head 56' which, like the head 56, comprises one track of the head 36.

Figure 4:
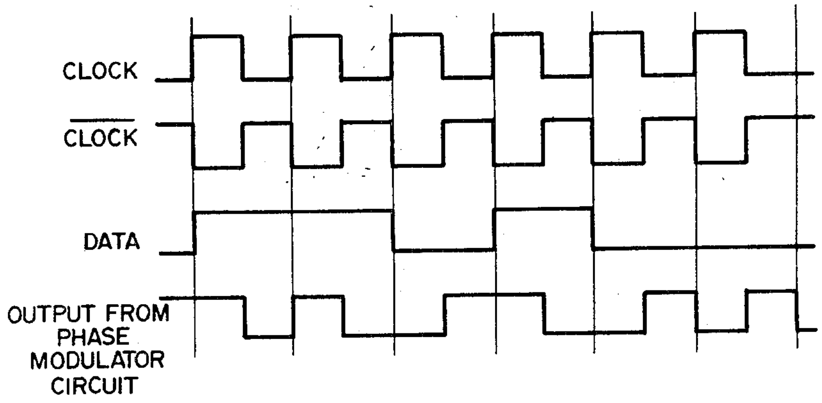
FIG. 4 is a timing diagram illustrating the operation of the system shown in FIG. 2.

The operation of the phase-modulation circuits 50 and 50' of the channel 40 will be better understood by referring to FIG. 4. The modulator circuits receive a clock input having the wave form shown in the upper path of FIG. 4. By means of an inverter, the circuits 50 and 50' are also provided with an inverted clock signal having the wave form shown in the second path.

The modulator circuits combine the clock inputs with a data input to produce an output comprising the clock input if the data received is a one and to provide an output comprising the inverted clock input whenever the data received is a zero. Therefore, assuming the data shown in the third path of FIG. 4 is received by a modulator circuit, the circuit produces the output shown in the fourth path of FIG. 4. It should be noted that each phase-modulated bit produced by the modulator circuits includes a crossover, that is, a change from one to zero or a change from zero to one, at its midpoint. By this means, the bits produced by the modulator circuits are self-clocking.

Figure 5:
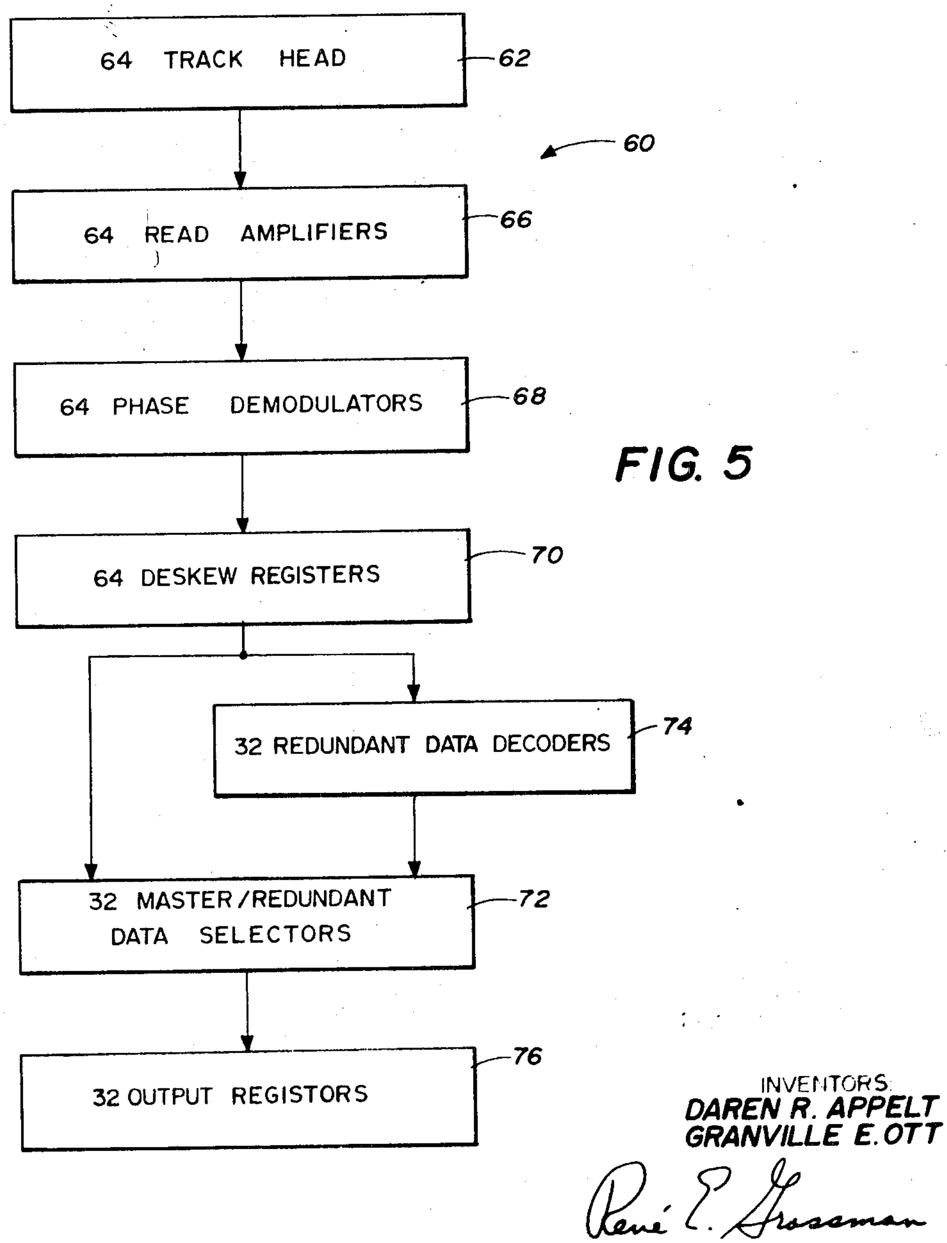
FIG. 5 is a block diagram of an information reading system that operates in accordance with the technique shown in FIG. 1.

FIG. 5 comprises a block diagram of an information reading system 60 that operates to reproduce information recorded in accordance with the technique 10. The system 60 includes a 64 track magnetic tape reading head 62 having outputs connected to a group of 64 read amplifiers 66. The outputs of the amplifiers of the group 66 are directed to a group of 64 phase demodulators 68 which convert the bits read by the head 62 out of the phase modulation format. Also, the phase demodulators comprising the group 68 reconvert each byte of the data from serial to parallel.

The outputs of the phase demodulators extend to a group of 64 deskewing registers 70. The registers comprising the group 70 receive bytes in parallel from the phase demodulators and transmit the bytes in parallel to the remainder of the system 60. The function of the registers comprising the group 70 is to provide for misalignment of the magnetic tape relative to the head 62. By means of the deskewing registers, all of the bytes that were recorded parallel to each other at any given point on the tape are brought together for subsequent parallel processing in the system 60.

The deskewing registers comprising the group 70 provide two sets of outputs. One set includes the bytes comprising the master data and is directed to a group of 32 master/redundant data selectors 72. The other set includes the bytes comprising the redundant data. This set is directed to a set of 32 redundant data decoders 74 which perform the inverse of the function performed by the redundant data encoders of the set 26 of the system 20. The outputs of the set 74 are directed to the master/redundant data selectors of the group 72.

The master/redundant data selectors comprising the group 72 have outputs that extend to a group of 32 output registers 76. If the parity of the bytes comprising the master data is correct, the master data bytes are directed from the selectors of the group 72 to the registers of the group 76. On the other hand, if the parity of a particular master data byte is not correct, the corresponding redundant data byte is transmitted to the group of output registers 76. In any event, the registers 76 transmit the data in parallel to a data utilization device (not shown).

Figure 6:
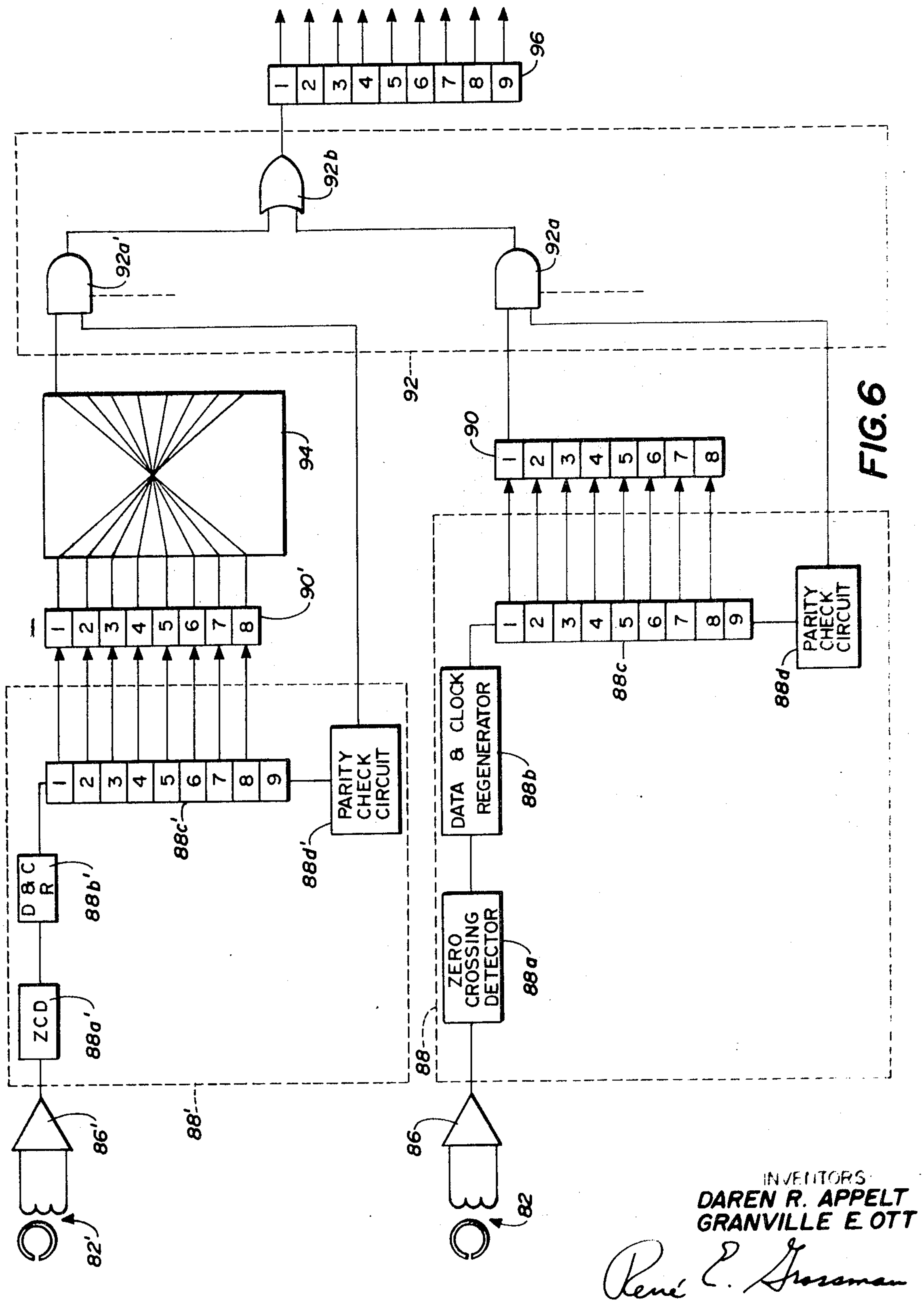
FIG. 6 is a schematic illustration of one channel of the system shown in FIG. 5.

The operation of the system 60 will be better understood by referring to FIG. 6 wherein one channel 80 of the system 60 is shown. The channel 80 comprises a path of a single data byte through the system 60. It will be understood, however, that the remaining data bytes follow paths that are identical to the path illustrated in FIG. 6.

The channel 80 includes a magnetic tape reading head 82 comprising one track of the head 62 of the system 60. The output of the head 82 is connected to a read amplifier 86 which comprises one amplifier of the group 66 and which is preferably a differential amplifier. The output of the amplifier 86 is directed to a phase-demodulation circuit 88 comprising one of the demodulators of the group 68.

The phase-demodulation circuit 88 includes a zero crossing detector circuit **88*a* and a clock and data regenerator circuit 88*b*. The zero crossing detector circuit 88*a* produces output in response to each zero crossing of the output of the head 82 and operates to reshape the output signal. The clock and data regenerator circuit 88*b* operates upon the output of the zero-crossing detector circuit 88*a* to produce clock and data signals similar to those supplied to the phase-modulation circuits of the channel 40**.

The phase-demodulation circuit 88 also includes a serial in, parallel out shift register **88*c* which receives data bytes serially from the clock and data regenerator circuit 88*b* and which transfers the bytes in parallel to a parallel in, parallel out shift register 90. The register 90 comprises one of the group of deskewing registers 70 and operates to store data bits for the period of time necessary to feed each byte serially into the register 88*c*. By this means, the group of deskewing registers 68 accommodate a skew of up to nine bits across the width of the tape that is read by the head 62 and yet transfer all of the bytes that were recorded parallel to each other across the tape to the remainder of the system 60** simultaneously.

The phase-demodulation circuit 88 further includes a parity check circuit **88*d*. The circuit 88*d* computes the parity of each byte received by the register 88*c* and then compares the computed parity with the parity bit of the byte. The circuit 88*d* produces an output whenever a byte having correct parity is received by the register 88*c*** and produces no output whenever a byte having incorrect parity is received.

The channel 80 further includes a redundant tape reading head 82', a redundant read amplifier 86' and a redundant phase-demodulation circuit 88' which are identical in construction and function to the head 82, the amplifier 86 and the circuit 88, respectively. The circuit 88' includes a serial in, parallel out shift register **88*c*' which feeds redundant data bytes in parallel to a parallel in, parallel out shift register 90' comprising one of the group of the deskewing registers 70. The deskewing register 90' supplies a parallel output to a redundant data decoder circuit 94. In the example shown, the circuit 94 reverses the order of the bits supplied from the register 70'**.

The outputs of the register 90 and the decoder 94 are supplied to a master/redundant data selector 92 comprising one of the group of selectors 72. The selector 92 includes a plurality of AND-gates **92*a* each of which gates the output of one stage of the shift register 90 with the output of the parity check circuit 88*d*. The circuit 92 further includes a plurality of AND-gates 92*a* each of which gates one output from the decoder circuit 94 with the output of a parity check circuit 88*d*'**.

The gates **92*a* and 92*a*' both have outputs extending to an OR-gate 92*b*. Thus, if either of the gate 92*a* or 92*a*' produces an output indicative of the receipt of a byte having correct parity, the gate 92*b* produces an output. The OR-gates 92*b* of the selector 92 are each connected to one stage of a parallel in, parallel out shift register 96 comprising one of the group of registers 76. The register 96 stores each data byte received by the channel 80** until it is called for by a utilization device (not shown).

The channel 80 may also include a parity failure alarm circuit (not shown). The alarm circuit may comprise an AND gate that receives the inverted outputs of the parity check circuits 88*d* and 88*d'*. Such a gate generates an output if the master byte and the redundant byte both include parity errors.

Figure 7:
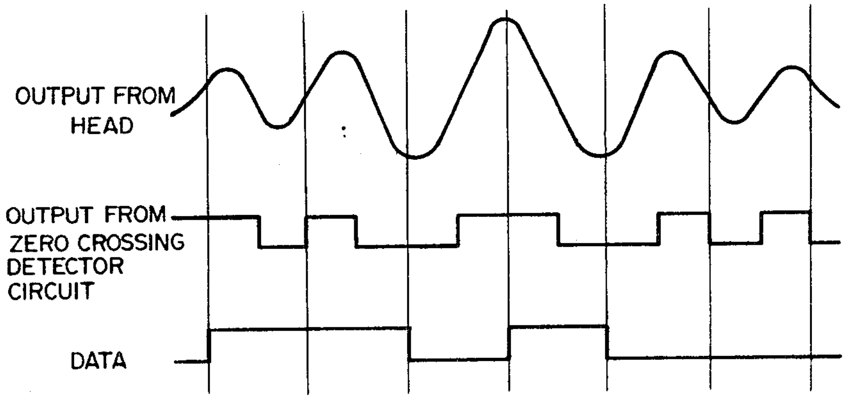
FIG. 7 is a timing diagram illustrating the operation of the system shown in FIG. 5.
Figure 8:
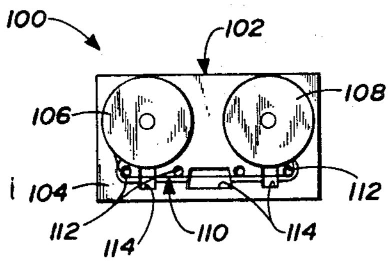
FIG. 8 is a front view of a tape cartridge.

The operation of the phase-demodulation circuits 88 and 88' of the channel 80 will be better understood by referring to FIG. 7. The uppermost path in FIG. 7 comprises an illustration of a typical output of the magnetic tape reading head 82. The second path shows a wave form of the upper path after it is operated upon by the zero-crossing detector circuit 88*a* of the phase-demodulation circuit 88. The lower path of FIG. 7 shows the output of the data and clock regenerator circuit 88*b*.

It will be noted that the middle path of FIG. 7 is identical to the lower path of FIG. 4. Thus, the zero-crossing detector circuit 88*a* of the phase-demodulator circuit 88 regenerates the output of the phase-modulation circuit 50 of the channel 30. It will be further noted that the lower path of FIG. 7 is identical to the third path of FIG. 4. Thus, the data regenerator circuit 88*a* of the phase-demodulation circuit 88 regenerates the data that was recorded by the recording system 20.

In accordance with the preferred embodiment of the invention, an information storage system includes both an information writing system of the type shown in FIG. 2 and information reading system of the type shown in FIG. 5 and further includes a tape-handling system such as the system 100 shown in FIGS. 8, 9, 10 and 11. Conventional ½-inch magnetic tapes are mounted in tape cartridges such as the cartridge 102 shown in FIG. 8. The cartridge 102 comprises a plastic housing 104 that encloses and rotatably supports a pair of tape reels 106 and 108. A magnetic tape 110 extends between the reels 106 and 108 and is guided by a plurality of guide posts 112 formed in the housing 104. A plurality of openings 114 are formed through the housing 104 at spaced points along the path of the tape 110.

Figure 9:
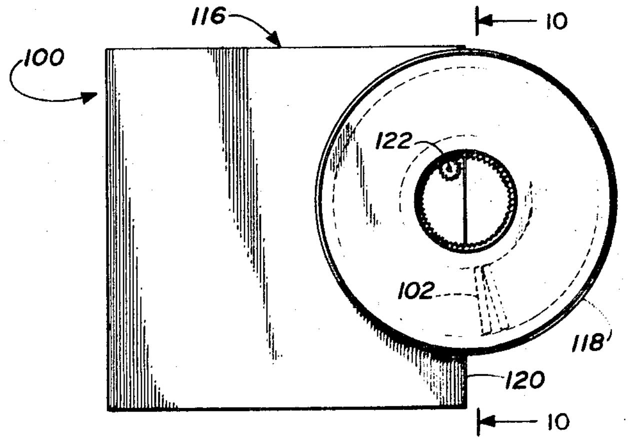
FIG. 9 is a top view of a cartridge selecting system.

Referring now to FIG. 9, the tape-handling system 100 further comprises a cartridge handling system 116 including at least one turret 118. The turret 118 comprises an annular cartridge transporting structure and is rotatably mounted on a housing 120 that encloses a magnetic tape writing system such as the system 20 shown in FIG. 2 and a magnetic tape reading system such as the system 60 shown in FIG. 5. The turret 118 has a plurality of teeth extending around its inner circumference and is rotated relative to the housing 120 by a gear 122 that is driven from within the housing.

Figure 10:
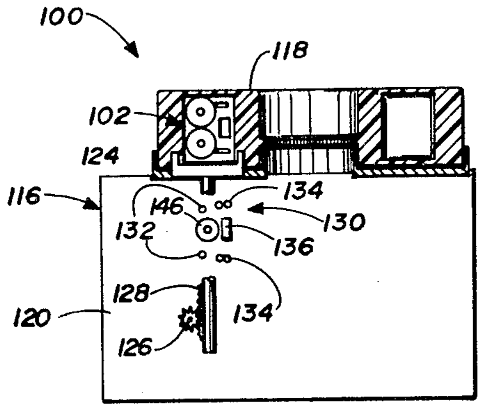
FIG. 10 is a front view of the system shown in FIG. 9.

As is best shown in FIG. 10, a cartridge elevator 124 is mounted at the front of the housing 120. The elevator 124 is normally positioned at the bottom of the turret 118 and serves to support cartridges 102 in the turret during rotation of the turret relative to the housing 120. Whenever the desired cartridge 102 is positioned in alignment with the elevator 124, a gear 126 that is mounted in mesh with a rack 120 formed on the elevator 124 is rotated from within the housing 120. As the gear 126 rotates, the elevator 124 lowers the selected cartridge 102 into alignment with an information recording/reproducing station 130 positioned on the face of the housing 120.

The recording/reproducing station 130 includes a pair of spindles 132 that engage the reels 106 and 108 of the selected cartridges 102, a pair of tape drive capstans 134 and a head assembly 136. The head assembly 136 includes a magnetic tape recording head similar to the head 36 of the system 20 and a magnetic head similar to the head 62 of the system 60. The capstans 134 and the head assembly 136 of the station 130 are positioned for engagement with the tapes 110 of the cartridges 102 upon engagement with the openings 114 in the cartridges.

Figure 11:
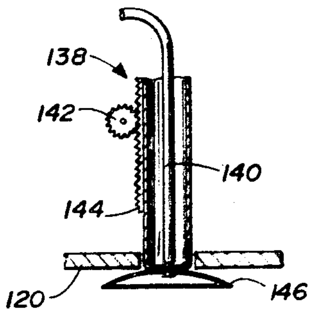
FIG. 11 is a partial sectional view of the system shown in FIG. 9 in which certain parts have been omitted more clearly to illustrate certain features of the invention.

The cartridge-handling system 116 further includes a cartridge moving apparatus 138 of the type shown in FIG. 11. The apparatus 138 comprises a suction tube 140 that is connected to a vacuum source (not shown). The tube 140 is selectively moved into and out of the front of the housing 120 by a gear 142 that engages a rack 144.

Whenever a selected cartridge 102 is properly positioned relative to the recording/reproducing station 130 by the elevator 124, the vacuum source is actuated and the tube 140 is moved outwardly until a suction cup 146 on the end of the tube engages the cartridge. The cup 146 grips the cartridge 102 and is thereafter moved backwardly until the cartridge engages the components of the station 130. At this point, the systems within the housing 120 are operated to either record information on or read information from the tape in the cartridge in accordance with the technique 10 illustrated in FIG. 1.

At the completion of the operation of the systems within the housing 120, the tube 140 is moved outwardly until the selected cartridge 102 is aligned with the elevator 134. Then, the vacuum source is deactuated and the tube 140 is withdrawn. The elevator 124 is then moved upwardly until the cartridge 102 is positioned within the turret 118. Thereafter, the turret 116 is rotated until another cartridge 102 is aligned with the elevator 112, whereupon the operation of the tape handling system 100 is repeated.

In accordance with the preferred embodiment of the invention, bit spacing on the tapes is 6,000 bits per inch and each tape has a length of 2,500 feet. Each turret supports 40 cartridges and any cartridge can be positioned at the information recording/reproducing station within 4 seconds. Such a system has a data transfer rate of 3-million bytes per second and has a data storage capacity of 48-billion bits. Thus, the data capacity, the data transfer rate and the access time of the system are superior to those of presently available magnetic tape systems by factors of 200, 20 and five, respectively. The cost of the system is less than that of presently available systems having one-tenth the data storage capacity.

The various components of the information storage system shown in the drawings can be altered to suit particular needs. For example, both the widths of the tapes employed in the system and the number of tracks on each tape can be varied. Tapes of any convenient length can be used, it being understood that the longer the tape, the slower the access time of the system, Finally, any number of turrets can be used and each turret can accommodate any number of cartridges. Even if the turret is eliminated entirely, the system still has over 10 times the data transfer rate and over 10 times the data storage capacity of presently available systems.

It should be understood that the present invention is not limited to systems in which bits are recorded by phase modulation. For example, bits may be recorded by frequency modulation, if desired. In fact, any bit recording system that provides self-clocking bits and that results in high-density bit spacing may be employed in the practice of the invention.

Although specific embodiment of the invention is illustrated in the drawing and described herein, it will be understood that the invention is not limited to the embodiment disclosed but is capable of rearrangement, modification and substitution of parts and elements without departing from the spirit of the invention.

We claim:

1. An information storage system comprising:
a turret,
a plurality of cartridges in said turret, each cartridge including a length of magnetic tape,
an information recording/reproducing station,
said turret rotatably mounted for positioning selected cartridge at said information recording/reproducing station,
an elevator at said information recording/reproducing station for moving said selected cartridge into alignment with said station,
and means at said station for simultaneously recording data on and for simultaneously reproducing data from a plurality of master data tracks and a plurality of redundant data tracks.

2. The information storage system claimed in claim 1 having a suction cup for engaging said selected cartridge to move said selected cartridge.

3. The information storage system according to claim 1 wherein each redundant data track corresponds to a master data track and wherein the same data is simultaneously recorded on and reproduced from a master data track and the corresponding redundant data track.

4. The information storage system according to claim 3 further including means for encoding the data as it is recorded on the redundant data tracks and for decoding the data as it is reproduced from the redundant data tracks.

5. The information storage system according to claim 1 wherein the data is recorded in the form of self-clocking bits.

6. The information storage system according to claim 5 wherein the data is recorded in the form of multiple-bit data bytes and further including means for simultaneously recording each byte serially along a master data track and a redundant data track and for encoding each byte as it is recorded along a redundant track.

* * * * *